Oct. 20, 1964  M. WEISS  3,153,723
INTERNAL MIRROR DRUM SCANNING DEVICE
Filed Dec. 20, 1961

INVENTOR.
MORRIS WEISS
BY *Robert Ames Norton*
ATTORNEY

United States Patent Office 3,153,723
Patented Oct. 20, 1964

3,153,723
INTERNAL MIRROR DRUM SCANNING DEVICE
Morris Weiss, Stamford, Conn., assignor to Barnes Engineering Company, Stamford, Conn., a corporation of Delaware
Filed Dec. 20, 1961, Ser. No. 160,792
3 Claims. (Cl. 250—83.3)

This invention relates to a scanning system and more particularly to a radiation actuated gage using the system.

The most important field for use of the present invention is in gages which scan across the object the dimensions of which are to be measured, for example infrared dimensional gages. It should be understood that the scanning system of the present invention can also be used for other purposes and in its broadest aspect is not limited to a dimensional gage. However, the advantages and the solution to the difficult problems presented make it desirable to describe the present invention more particularly in conjunction with the radiation actuated gages.

In recent years the problem of gaging the dimensions of materials from a distance has become acute and the most promising approach involves scanning of a radiation detector across the dimensions of the material and deriving from the detector output through suitable electronic circuits, a final output from which accurate measurements of the dimension can be obtained. The first field which presented the distant gaging problem was in steel mills. Rods and bars which are rolled out thin through various stages of rolls finally emerge at high speed up to 90 miles an hour and, of course, the rod is hot. This has presented a very serious gaging problem because the rod whips somewhat and, therefore, any gaging method which requires contact during extrusion was impractical.

A gage for steel rods and bars has been developed and is in practical commercial use. This gage is described and claimed in the patent to Astheimer 3,003,064 October 3, 1961. In the Astheimer gage scanning is effected by a rotating reticle with a series of small holes spaced a distance greater than the image of the material to be scanned so that radiation from the steel rod reaches the detector only through a single hole at a time. Because of the temperatures of a steel rod the gage operates most effectively by means of infrared radiation though, of course, the gage is not limited thereto and can use any optical radiation, that is to say radiation of wavelength sufficiently short to obey optical laws accurately. The Astheimer gage produced satisfactory results for steel rods being capable of measuring a half inch rod within 0.001". This is quite adequate for steel mill requirements but certain other gaging situations have presented problems for which the Astheimer gage is not the perfect solution. One of these problems is encountered in the gaging of hot extruded glass tubing.

If infrared radiation in the near infrared, for example using a lead sulfide detector, is used as is preferred in the Astheimer gage serious problems arise. At the fairly short infrared wavelengths ranging from $1.8\mu$ to something over $3\mu$ glass is not opaque to infrared radiation and so the radiations from the glass tubing are not uniform. This has made the simple, rugged and compact Astheimer gage unsuitable for maximum precision of measurement. If longer wavelength infrared, for example $4\mu$ or longer, is used the physical properties of glass no longer present an insuperable problem to precision gaging. However, another problem arises. If it is attempted to use thermistor bolometers as detectors or even some photoconductors detector responsivity is sufficiently lowered so that there is not enough energy to make measurements with the desired precision. This lack of energy which is a basic limitation on the type of scanning in the Astheimer patent is the field in which a more perfect solution is made possible by the present invention. The invention is, of course, also useful in other situations where acute energy problems are presented.

The gage described in the Astheimer patent requires quite small holes in the reticle to permit the desired degree of precision. This means that the image of the object must be in the plane of the reticle and as a result it is customary to utilize field lenses between the reticle and the detector. The field lens images on the detector the entrance pupil of the whole scanning system and in order to collect a fair amount of energy the entrance pupil must be quite large. It is true that theoretically if an instrument can be sufficiently long and large quite a small detector can be used with correspondingly high responsivity. Here, however, practice and theory part their ways. It is vitally essential in dimensional gages that the scanning heads be extremely compact. There simply is not room for scanning heads several feet or meters long. As a result the detectors used in the Astheimer gage are comparatively large and, therefore, have a lower responsivity.

The present invention utilizes a different form of scanning, albeit a form the basic optical principles of which are not broadly new. In this form of scanning the small space element which is scanned across the object to be measured is imaged directly on the detector. In effect the detector and not the reticle opening is scanned across the object. When the small area scanning across the material object is directly imaged on the detector the image can be quite small, much smaller than the image of the entrance pupil in the scanning system described in the Astheimer patent. However, although the fact that a small image and hence a small detector with high responsivity was known to be achievable by this general method of scanning no system hitherto has been practical for gages where extreme compactness of scanning head is an essential requirement. The present invention solves this problem and provides for scanning the detector across the object simply and reliably and thus greatly increases the sensitivity of the instrument for detector responsivity with thermal detectors, particularly thermistors, increases inversely as the square root of the area of the detector.

According to the present invention in the scanning head collecting optics of more or less conventional design are used, for example a germanium lens. However, the beam to the detector is reflected from a pierced stationary mirror or analogous optical instrument onto a rapidly rotating drum scanner having mirror segments on the inside of the drum. The detector is fixed inside of the drum and preferably the reflected beam passes through a central hole in the mirror.

The internal drum scanner permits maintenance of a sharp focus on the detector over each mirror as it passes. Theoretically for perfection the drum would have to have an extremely large number of mirrored segments. However, so efficient is the optical organization that when the limitations of the other elements of the whole system are taken into consideration maximum precision can be obtained with a very moderate number of mirror segments. For practical use approximately eighteen constitutes a desirable number. It is, however, necessary that the detector be located on a radius of the drum so that the length of path from detector to the mirror changes but little as the mirror segment moves by and the change is entirely symmetrical, the path being slightly longer at the edges and shortest in the middle. This is best effected by using a perforated folding mirror which permits location of the detector on a radius and preferably at the center of rotation of the drum scanner.

The internal drum scanner should not be confused with a common form of drum scanning device where mirror segments or facets are on the outside. Such a construction is completely useless as the path length change from mirror to detector is rendered a maximum which precludes accurate imaging on the detector.

With a greatly increased sensitivity due to a higher responsivity of the very small detector it now becomes possible to gage materials where the energy at the detector would not be practical with an ordinary gage using reticle scanning. This opens up new fields for gaging such as glass tubing which has been referred to above and even with steel rods where the Astheimer gage has achieved practical success it is possible to increase the precision. However, wherever the tolerances and energy factors permit the reticle scanner of the Astheimer patent is preferable as it is somewhat cheaper, lighter and slightly more rugged than the internal mirror segmented drum of the present invention. As with many practical instruments there is no one instrument which is perfect for all uses and the improvements in precision and energy utilization made possible by the present invention make the improved scanning device useful wherever these are required. Where, however, the precision and energy utilization is not required the reticle scanning described in the Astheimer patent may be preferable.

Reference has been made to the substantially constant path length to the detector as a mirror segment moves past. The importance of this characteristic of the present invention, which achieves a degree of path constancy adequate for most purposes with a very moderate number of mirror segments, merits some discussion. Most dimensional gages using radiation scan across the background and then across a sudden radiation discontinuity as the object to be gaged is scanned followed by a second sharp discontinuity as a scan moves off onto the background. One of the limitations on dimensional accuracy is the so-called edge effects which are accentuated if detectors of longer time constant are used. Unless there is a sharp focus at the point when the edge is scanned this will introduce an inaccuracy even with the most sophisticated electronic circuits. Theoretically if the object being gaged always remained exactly centered edge error would be somewhat minimized insofar as it is affected by optical path length to the detector. The assumption made above is not applicable to most practical situations. A rapidly extruded steel rod or glass tubing will not maintain its position exactly. There is always some whipping or slight movements from side to side and, therefore, if a scanning system is employed which is only useful for an object that is exactly centered serious discrepancies can arise. This is why the close approximation to constant path length from mirror to detector is of such great practical importance.

It will be noted that in the present invention there is a very pronounced optical leverage which permits scanning a small angle in space along a relatively large drum rotation angle. This leverage makes it possible to use a relatively small number of mirror segments within the drum and as a result the number of the segments is determined only by considerations of sharp focus.

The invention will be described in greater detail in conjunction with the gaging of hot glass tubing, a field for which the invention is particularly well suited. This is illustrative only and not intended to limit the invention to use in gaging this particular type of material. The invention will also be described in connection with the drawings in which.

Figures 1, 2:
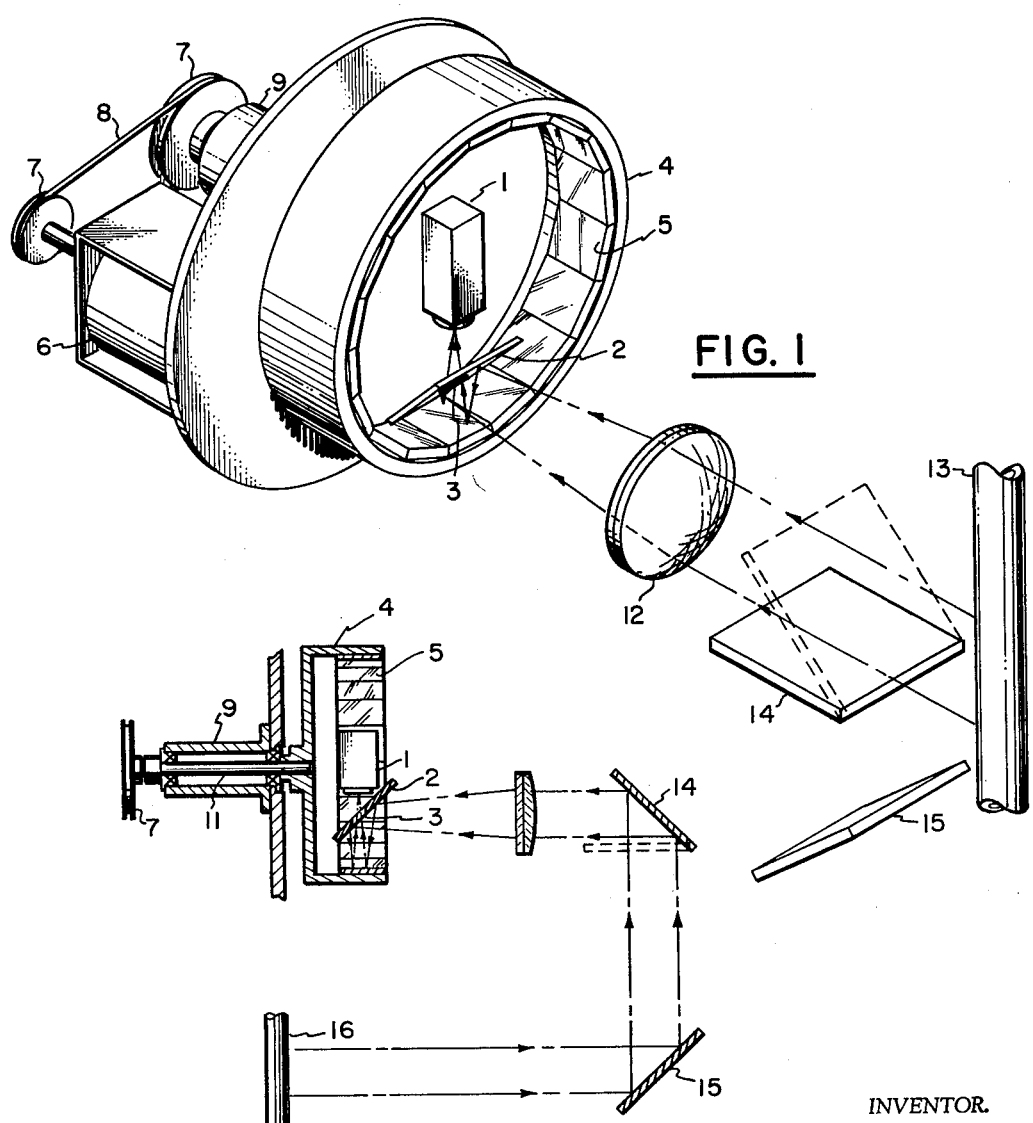
FIG. 1 is an isometric view with the optical path in diagrammatic form.
FIG. 2 is a section along line 2—2 of FIG. 1 which also shows further details of a calibrating mechanism.

The scanning mechanism includes a detector package 1 of conventional design centered in a rotating scanning drum 4 provided with mirror segments 5. Radiation from the mirror segments is reflected into the detector through an opening 3 in a folding mirror 2. The drum is rotated by motor 6 through pulleys 7 and a belt 8 which turns the shaft 11 of the drum. This shaft is journalled in a mounting 9. Glass tubing to be gaged is shown at 13, radiation from which enters the scanning system at the objective 12, which may, for example, be a lens of germanium. The beam is then reflected from the folding mirror 2 and from the mirror segments 5 onto the detector through the opening 3 as described above. The mirror segments are dimensioned in accordance with the other elements so that as the drum rotates the detector first sees background on one side of the tube 13, then strikes the edge of the tube, scans across it, leaves it and sees the background on the other side. Then a second mirror segment is encountered and the scan is repeated. With eighteen mirrors there are eighteen scans per revolution so that the drum can turn at moderate speed and still scan at a fairly high frquency. The drum is well balanced and can be rotated at high speeds if necessary. In fact the scanning frequency is determined not by the capabilities of the drum but by the response of the detector. This is an important characteristic for there are many types of scanning mechanisms in which a detector or mirror is oscillated which do not lend themselves to high speed and to uniform movement which is possible in a light rotating drum.

Depending on the electronic circuits which are used to process the information from the detector radiation intensity may or may not be a significant factor. In a number of cases where maximum precision is desirable it is also desirable to calibrate from time to time against a standard radiation source. A simple procedure for periodic calibration is shown. This is effected by a movable mirror 14 which can be thrown into the beam of the instrument and which can receive, via a second folding mirror 15, radiation from a source 16 which is a rod maintained at a particular temperature and preferably of the same dimensions as is desired for the tubing. This can be used to further compensate for edge effects as there will be the same response from the round reference rod as from the object actually being gaged. It would, of course, be possible to calibrate continuously by a conventional mirror chopper in place of the folding mirror 14 but ordinarily this is not necessary and the added complication and loss in detector energy seldom make it worth while. The illustrated calibration source for intermittent calibration is typical and constitutes a type which is preferable.

The invention has been described in connection with glass tubing and in such a case the detector should respond mainly to infrared wavelengths for which the glass is substantially opaque. A lead sulfide detector is not suitable but a lead selenide detector may be used. Similarly a thermistor may be used with suitable filtering means. The germanium lens 12 already cuts off radiation of wavelength shorter than $1.8\mu$ and further limitation to still longer wavelengths may be incorporated.

In the specific description the object being gaged was self-luminous, that is to say it radiated more intensely than the background. For a great many practical uses in gages this is the case but it should be understood that the scanning is equally effective where the background radiates more intensely than does the object itself which then is scanned as a relatively low radiating silhouette. When such reverse conditions are used frequently the radiations will be in the visible. Infrared is used primarily where the body to be gaged is self-luminous and where the amount of energy in the visible might be too small for measurement.

I claim:

1. A device for periodically scanning across an object emitting radiation comprising in combination and in optical alignment, (a) a single radiation detector system with a fixed detector element, the system responding substantially only to radiations for which the object is opaque, (b) a scanning drum surrounding the detector element and provided on its inner surface with plane mirror segments, means for rotating the drum, and (c) means, including the successive mirror segments of the drum, for imaging successive small areas on either side and across the object to be scanned onto a relatively large arc of the drum circumference.

2. A device according to claim 1 for scanning across glass tubing in which the radiation detector element is lead selenide and the detector system responds substantially only to radiations for which glass is opaque.

3. A scanning device according to claim 1 in which the imaging means (c) comprise a stationary mirror reflecting the image beam onto successive mirror segments and an opening in said mirror positioned to permit the reflected beam from said segments to pass through to form an image on the detector element of the detector system.

References Cited in the file of this patent

UNITED STATES PATENTS

| | | |
|---|---|---|
| 2,859,652 | Hopgood | Nov. 11, 1958 |
| 2,997,595 | Cary et al. | Aug. 22, 1961 |
| 3,027,457 | Mouly | Mar. 27, 1962 |